(12) United States Patent
Obuchi et al.

(10) Patent No.: US 8,761,083 B2
(45) Date of Patent: *Jun. 24, 2014

(54) RADIO COMMUNICATION METHOD OF INTERMITTENTLY TRANSMITTING CHANNEL QUALITY INDICATOR (CQI) INFORMATION

(75) Inventors: Kazuhisa Obuchi, Yokohama (JP);
Hideto Furukawa, Yokohama (JP);
Kazuo Kawabata, Yokohama (JP);
Yoshiharu Tajima, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 1504 days.

This patent is subject to a terminal disclaimer.

(21) Appl. No.: 11/176,512

(22) Filed: Jul. 8, 2005

(65) Prior Publication Data

US 2006/0171312 A1 Aug. 3, 2006

(30) Foreign Application Priority Data

Feb. 2, 2005 (JP) .................................. 2005-026461

(51) Int. Cl.
*H04W 4/00* (2009.01)

(52) U.S. Cl.
USPC .............................. 370/328; 370/329; 370/229

(58) Field of Classification Search
USPC .......... 370/229, 241, 395; 455/343, 456, 458, 455/573, 574
See application file for complete search history.

(56) References Cited

U.S. PATENT DOCUMENTS

| | | | | |
|---|---|---|---|---|
| 5,881,055 | A * | 3/1999 | Kondo | 370/311 |
| 6,144,693 | A * | 11/2000 | Tabeta | 375/132 |
| 6,597,915 | B2 * | 7/2003 | Shi et al. | 455/456.1 |
| 6,606,313 | B1 * | 8/2003 | Dahlman et al. | 370/347 |
| 6,697,642 | B1 * | 2/2004 | Thomas | 455/562.1 |
| 6,871,078 | B2 * | 3/2005 | Nishioka et al. | 455/522 |
| 7,664,126 | B2 * | 2/2010 | Funato | 370/412 |
| 2003/0100268 | A1 * | 5/2003 | Moulsley et al. | 455/69 |
| 2004/0116082 | A1 * | 6/2004 | Choi | 455/121 |
| 2004/0142698 | A1 | 7/2004 | Pietraski | |
| 2005/0164641 | A1 | 7/2005 | Niwano | |
| 2005/0213575 | A1 | 9/2005 | Shin et al. | |
| 2005/0277422 | A1 * | 12/2005 | Baker et al. | 455/450 |

FOREIGN PATENT DOCUMENTS

| | | |
|---|---|---|
| WO | 01/97538 | 12/2001 |
| WO | 03/069826 | 8/2003 |
| WO | 03/096577 | 11/2003 |
| WO | 2004/102827 | 11/2004 |

OTHER PUBLICATIONS

3$^{rd}$ Generation Partnership Project TS 25 212 V6. 2.0 Technical Specification Group Radio Access Network; Multiplexing and Channel Coding (FDD) (Release 6); Jun. 2004.

(Continued)

*Primary Examiner* — David Oveissi
(74) *Attorney, Agent, or Firm* — Myers Wolin, LLC

(57) ABSTRACT

To alleviate processing load of a communication apparatus (mobile station) for data transmission using the shared channels. A radio communication apparatus for receiving data via the shared channels, comprises a receiving unit for intermittent reception to determine whether the data received via the shared channels is transmitted to its own station or not in the first operational mode and a transmitting unit for intermittent transmission of information which influences the transmission format of the data a predetermined time before the intermittent reception timing of the receiving unit in the first mode.

18 Claims, 11 Drawing Sheets

(56) References Cited

OTHER PUBLICATIONS $3^{rd}$ Generation Partnership Project; TS 25.214 V6. 2.0, Technical Specification Group Radio Access Network; Physical Layer Procedures (DFF) (Release 6); Jun. 2004.

The State Intellectual Property Office of China; First Office Action for corresponding Chinese Patent Application No. 2005100917168; Dated Apr. 3, 2009; Partial English translation attached.

Partial European Search Report issued for corresponding European Patent Application No. 05254443.4, dated Sep. 16, 2010.

The State Intellectual Property Office of China "First Notification of Office Action" issued for corresponding Chinese Patent Application No. 201010503245.8, issued Jul. 20, 2011. English translation attached.

Final Office Action issued by the United States Patent and Trademark Office for corresponding U.S. Appl. No. 13/347,137, electronically delivered on Nov. 19, 2012.

* cited by examiner

RADIO COMMUNICATION METHOD OF INTERMITTENTLY TRANSMITTING CHANNEL QUALITY INDICATOR (CQI) INFORMATION

CROSS REFERENCE TO RELATED APPLICATION

This application is related to and claims priority to Japanese Application No. 2005-026461 filed Feb. 2, 2005 in the Japanese Patent Office, the contents of which are incorporated by reference herein.

BACKGROUND OF THE INVENTION

1. Field of the Invention

The present invention relates to a radio communication apparatus and more preferably to a radio communication apparatus used in a mobile communication system and a radio LAN system employing the UMTS (WCDMA) communication system.

2. Description of the Related Art

In recent years, data transmission utilizing a shared channel, which is capable of switching a transmission destination of data in accordance with the situation, is most frequently accomplished in place of the communication which is conducted by assigning a fixed time slot.

In the data transmission system utilizing the shared channel, a communication apparatus on the receiving side (referred to as a receiving station) cannot foresee when data is transmitted from a communication apparatus on the transmitting side (referred to as a transmitting station). Therefore, the receiving station checks whether the data transmitted is destined to its own station or not by receiving every time data is transmitted from the transmitting station. When the data received is transmitted to its own station, the receiving station extracts and processes (decodes) the received data and thereafter outputs the data. However, when the received data is not transmitted to its own station, the receiving station is not required to decode and output the data.

Moreover, in the data transmission system utilizing the shared channel, it is sometimes required to utilize information from the receiving station at the time of transmitting the data.

For example, the information from the receiving station is used, when adaptive modulation and coding (AMC) is conducted for transmission of data.

The adaptive modulation and coding is necessary for adaptively changing the transmission method for the data transmission.

For example, a receiving station receives the signal transmitted from a transmitting station, measures the radio environment between the transmitting station and the receiving station (radio environment of the downlink) using such receiving signal, and then transmits the result of measurement to the transmitting station, while the transmitting station changes adaptively the transmission method on the basis of the result of measurement. Examples of changes in the transmission method include conversion of the QPSK modulation system into the 16QAM modulation system, a change in the number of the spreading codes used by the transmission, and a change in the data size (packet length) to be transmitted may be thought.

Here, the HSDPA (High Speed Downlink Packet Access) will be explained as an example of a system for data transmission utilizing a shared channel. The HSDPA is a system which is adopted into the UMTS (WCDMA) communication system to enable a high speed packet transmission system using the shared channel of the downlink. Moreover, in the radio LAN communication system, the high speed packet transmission system using the shared channel has also been proposed.

The HSDPA is employed not only on data transmission utilizing the shared channel, explained previously, but also to adaptive modulation and coding (AMC).

In addition, the HSDPA also employs the H-ARQ (Hybrid Automatic Repeat request) system. In this H-ARQ system, a re-transmission request is issued to a base station when a mobile station has detected an error in the received data from a base station. The base station having received this re-transmission request performs re-transmission of data. Accordingly, the mobile station is capable of effectively using the data already received and the received data of the re-transmission. As explained above, generation of useless transmission is eliminated by effectively utilizing the data already received.

Next, the principal radio channel used in the HSDPA will be explained.

The channels of the HSDPA include the HS-SCCH (High Speed-shared Control Channel), HS-PDSCH (High Speed-Physical Downlink Shared Channel), and HS-DPCCH (High Speed-Dedicated Physical Control Channel).

The channels HS-SCCH and HS-PDSCH are shared channels for downlink (namely, the direction to the mobile station from the base station), while the channel HS-SCCH is a control channel for transmitting a variety of parameters for the data to be transmitted by the HS-PDSCH channel. Various parameters include, for example, the modulation scheme information indicating the modulation scheme to be employed, the number of spreading codes to be assigned, and information such as the pattern of the rate matching process to be accomplished before transmission.

Meanwhile, the HS-DPCCH is an individual control channel (Dedicated Control Channel) for the uplink (namely, the direction to the base station from the mobile station). For example, this channel is used by the mobile station to transmit, to the base station, the result of acknowledgment or non-acknowledgment of reception of data received from the base station via the HS-PDSCH channel respectively as the ACK signal and NACK signal (response signal). If a mobile station fails in reception of data (a CRC error is generated in the received data), a base station accomplishes re-transmission control because the NACK signal is transmitted from a mobile station as the re-transmission request. Moreover, when neither the ACK signal nor the NACK signal are received (in the case of the DTX state), the radio base station also conducts re-transmission control. Accordingly, occurrence of the DTX state in which the mobile station does not transmit the ACK and NACK signals may also be considered as one of the re-transmission requests.

Moreover, the HS-DPCCH channel is also used to transmit receiving quality information (for example, SIR) of the received signal from the base station measured by the mobile station to the base station as the CQI information (Channel Quality Indicator). The base station varies a transmission method of the downlink with the CQI information received. Namely, when the CQI information indicates a better radio environment of the downlink, the transmission method is switched to a modulation scheme enabling higher speed transmission of data. When, on the contrary, the CQI information does not indicate a good radio environment of the downlink, the transmission method is switched to a modulation scheme enabling low speed transmission of data (namely, adaptive modulation control (adaptive modulation and coding).

[Channel Format]

Next, a channel format of the HSDPA channel will be explained.

FIG. 1 is a diagram illustrating the channel format of the HSDPA channel. Since the W-CDMA employs the code division multiplex system, each channel is divided by codes.

The channels not yet explained will be explained first. The CPICH (Common Pilot Channel) is the common channel for the downlink which is used to transmit data to all mobile stations in the radio zone (cell).

The CPICH channel is used in the mobile station for channel estimation and cell search and used as the timing standard for the other downlink physical channel in the same cell also. Namely, this channel is used to transmit the so-called pilot signal.

Next, timing relationships of the channels will then be explained with reference to FIG. 1.

As illustrated in FIG. 1, one frame (10 ms) is formed with 15 slots (=3×5, each slot corresponds to a 2560-chip length) in each channel. As is already explained above, since the CPICH is used as the other channel standard, the first frame of the frames in the P-CCPCH and HS-SCCH channels is matched with the first frame of the frames in the CPICH channel. Here, the first frame of the frames in the HS-PDSCH is delayed by two slots from the HS-SCCH or the like for enabling demodulation of the HS-PDSCH with the demodulation scheme corresponding to the modulation scheme received after the mobile station has received the modulation scheme information via the HS-SCCH. Moreover, the HS-SCCH and HS-PDSCH form one sub-frame with three slots. A mobile station receives every sub-frame in the HS-SCCH to check whether data is transmitted or not to it's own station. When the data is transmitted to its own station, the mobile station receives (decodes) the HS-PDSCH. When the data is not transmitted to its own station, the mobile station does not receive (decodes) the HS-PDSCH.

The HS-DPCCH is the channel of the uplink including the slot (one slot length) which is used for transmitting the ACK/NACK signal as the response signal for verifying reception to the base station from the mobile station after about 7.5 slots from reception of the HS-PDSCH.

Moreover, the HS-DPCCH is also used for periodic feedback transmission of the CQI information for adaptive modulation and coding to the base station. Here, the CQI information to be transmitted is calculated, for example, on the basis of the receiving environment (for example, the result of SIR measurement of the CPICH) measured in the period up to before one slot from before four slots of the transmission of CQI information.

Details about the HSDPA are disclosed, for example, in the non-patent document "3G TS 25. 212 (3rd Generation Partnership Project: Technical Specification Group Radio Access Network: Multiplexing and channel coding (FDD)) V6.2.0 (June, 2004)".

According to the background art explained above, application efficiency of channels can be improved by utilizing the shared channels, but since a receiving station receives the HS-SCCH with every sub-frame, if the data received not transmitted to its own station, it is a problem to be solved, from the viewpoint of the receiving station itself, that power is consumed for a useless receiving process.

Such problem will be explained briefly with reference to FIG. 2.

FIG. 2 illustrates the transmitting and receiving sequence of the HSDPA channel.

In FIG. 2, only the signals to be transmitted and received between the radio base station (BTS) and one mobile station (MS1) are shown. However, the signals are, of course, likely to be transmitted to other mobile stations in the blank areas of the HS-SCCH and HS-PDSCH channels.

As illustrated in the figure, the MS1 receives the CPICH, which is always transmitted from the BTS, and periodically transmits the result of the measurement to the BTS as the CQI information.

For example, when the MS1 transmits the CQI at time A in the figure and the BTS selects this MS1 as the next transmitting destination of the data, the HS-SCCH. (HS-PDSCH (DSCH)) to be transmitted to the MS1 at time B(C) in the figure becomes the data generated on the basis of this CQI information.

Namely, the BTS selects the transmission method corresponding to the CQI, transmits the modulation scheme and the spreading code information corresponding to such transmission method, and effectively accomplishes adaptive modulation and coding by transmitting the HS-PDSCH using such modulation scheme and spreading code.

However, there is no data, in some cases, to be transmitted to the MS1 (transmission of data to the other MS has the priority), and if this period is continued, the period in which the packet is not transmitted is likely to be generated in the MS1.

During this period, the MS1 is forced to accomplish the useless receiving processes (reception of the HS-SCCH or the like) and transmitting process (transmission of the CQI or the like) and uselessly consumes electrical power.

SUMMARY OF THE INVENTION

Accordingly, an object of the present invention is to ease the processing loads of a communication apparatus (mobile station) during data transmission utilizing the shared channels. Moreover, it is also an object of the present invention to effectively accomplish adaptive modulation and coding while alleviating the processing load.

In addition to the objects explained above, the effect which may be attained with each structure indicated in the best mode for carrying out the present invention explained later cannot be attained, on the contrary, with the related art is understood as one of the objects of the present invention.

In one embodiment of the present invention, a radio communication apparatus for receiving data via a shared channel, said radio communication apparatus comprises a receiving unit for intermittently accomplishing reception for determining whether data received via the shared channel is transmitted to its own apparatus or not in a first mode, and a transmitting unit for intermittently transmitting, in the first mode, information which influences a transmitting method of the data a predetermined time before the time of intermittent reception by the receiving unit.

Preferably a first period of the intermittent reception by the receiving unit is set identically to a second period of the intermittent transmission by the transmitting unit or shorter than the second period.

Preferably a second period of the intermittent transmission by the transmitting unit is set identically to a third period of the reception for generation of the information transmitted by the transmitting unit or longer than the third period.

Preferably the radio communication apparatus comprises a control unit which can be set to a second mode for transmitting the information more frequently than the intermittent transmission by the transmitting unit, wherein the control unit sets, for the second mode, a longer time duration of reception for generating the information transmitted by the transmitting unit in the first mode.

Preferably the radio communication apparatus comprises a control unit which may be switched to a third mode to allow reception by the receiving unit but does not allow transmission by the transmitting unit.

Moreover, the control unit accomplishes the switching operation in accordance with a period in which the data is not transmitted to its own apparatus via the shared channel.

Preferably the shared channel is the HS-PDSCH channel, the radio communication apparatus is a mobile station corresponding to the HSDPA, the receiving unit receives the HS-SCCH channel, and the transmitting unit transmits the CQI information.

In one embodiment of the present invention, a radio communication apparatus for receiving data via a shared channel, said radio communication apparatus comprises a receiving unit for intermittent reception to determine whether data received via the shared channel is transmitted to its own apparatus or not in a first mode, and a transmitting unit for transmitting information which influences reception when the information changes exceeding the predetermined range.

In one embodiment of the present invention, a radio communication apparatus for transmitting data via a shared channel, said communication apparatus comprises a transmitting unit for transmitting, to a receiving side communication apparatus that is able to become a receiving destination of the data, a control signal to control the receiving side communication apparatus for intermittent reception to determine whether the data received via the shared channel is transmitted to its own apparatus or not and also for intermittent transmission of information which gives influence on reception a predetermined time before the time of the intermittent reception by the receiving unit.

In one embodiment of the present invention, a radio communication apparatus for transmitting data via a shared channel, said radio communication apparatus comprises a control unit for limiting a period allowing transmission of data to a particular communication apparatus to non-continuous periods, and a transmitting unit for transmitting data to the particular communication apparatus within the range of the limited period on the basis of information intermittently transmitted from the particular communication apparatus.

Preferably the radio communication apparatus further comprises a notifying unit for notifying accomplishment of such limitation to the particular communication apparatus.

Here, the notifying unit may also be configured to notify a message by transmitting a predetermined signal, for example, via the HS-SCCH.

Preferably such limitation is accomplished to the data to be transmitted to the particular communication apparatuses via the shared channel.

DETAILED DESCRIPTION OF THE PREFERRED EMBODIMENTS

The preferred embodiments of the present invention will be explained with reference to the accompanying drawings.

[a] Explanation of First Embodiment

In this embodiment, intermittent reception is accomplished to determine whether the data received via the shared channel is transmitted to its own station or not and the information influencing the transmission format of the data received via the shared channel is also accomplished a predetermined time before the timing of the intermittent reception.

Therefore, the processing load (power consumption) can be reduced by implementing the intermittent reception to determine whether the data received via the shared channel is transmitted to its own station or not and the transmission format of the data transmitted via the shared channel may be controlled adequately.

As explained previously, for data transmission utilizing the shared channel, a variety of communication apparatuses (for example, the radio communication apparatuses forming the radio LAN system or the like) may be used, but an example of the radio communication apparatus corresponding to the HSDPA explained previously will be explained here.

In this case, the shared channel corresponds to the HS-PDSCH, whether the data is transmitted to its own apparatus or not is accomplished by reception of the HS-SCCH, and the information giving influence on the transmission format corresponds to the CQI information.

Figure 1:
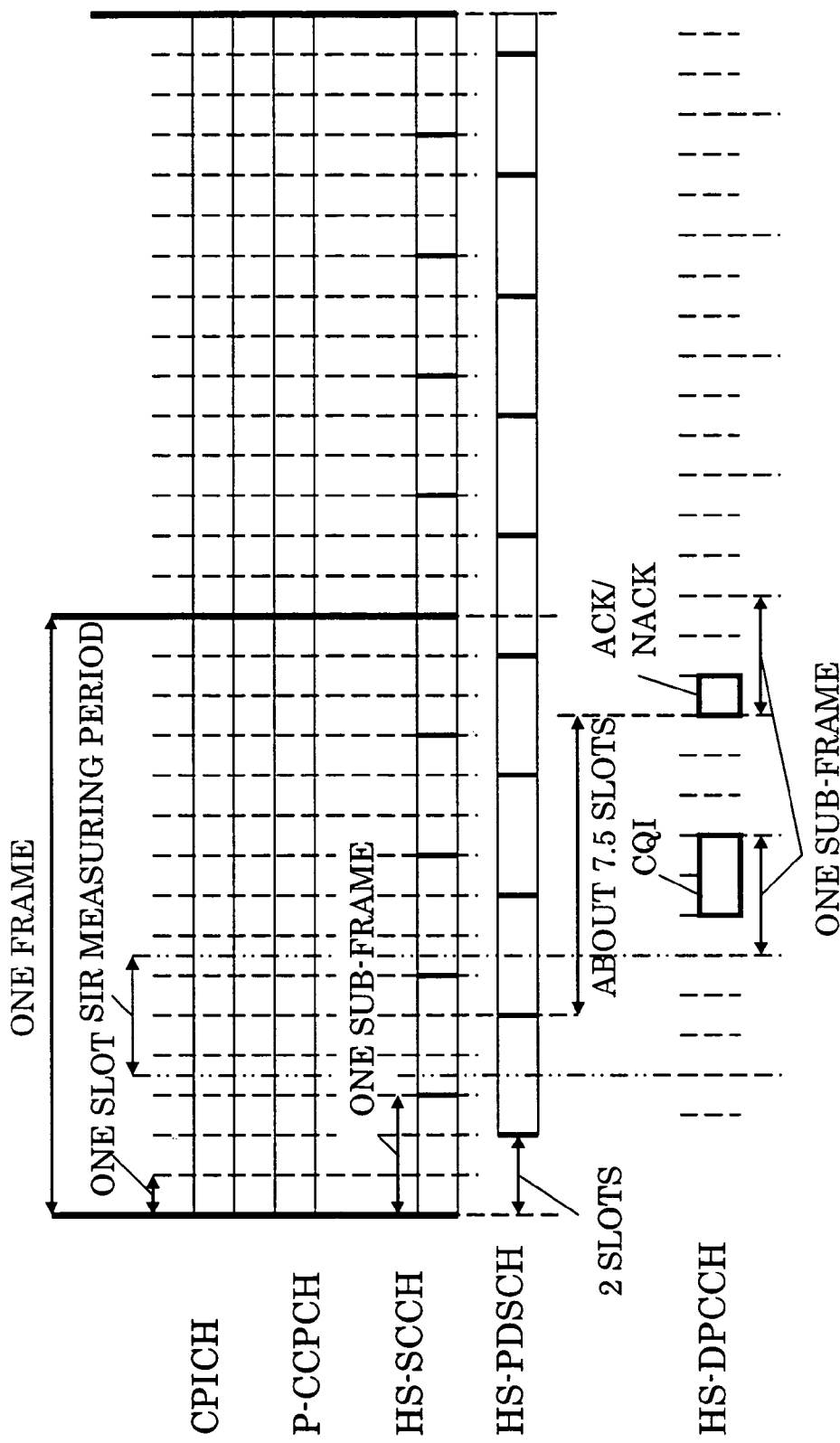
FIG. 1 shows a channel format in the HSDPA.
Figure 2:
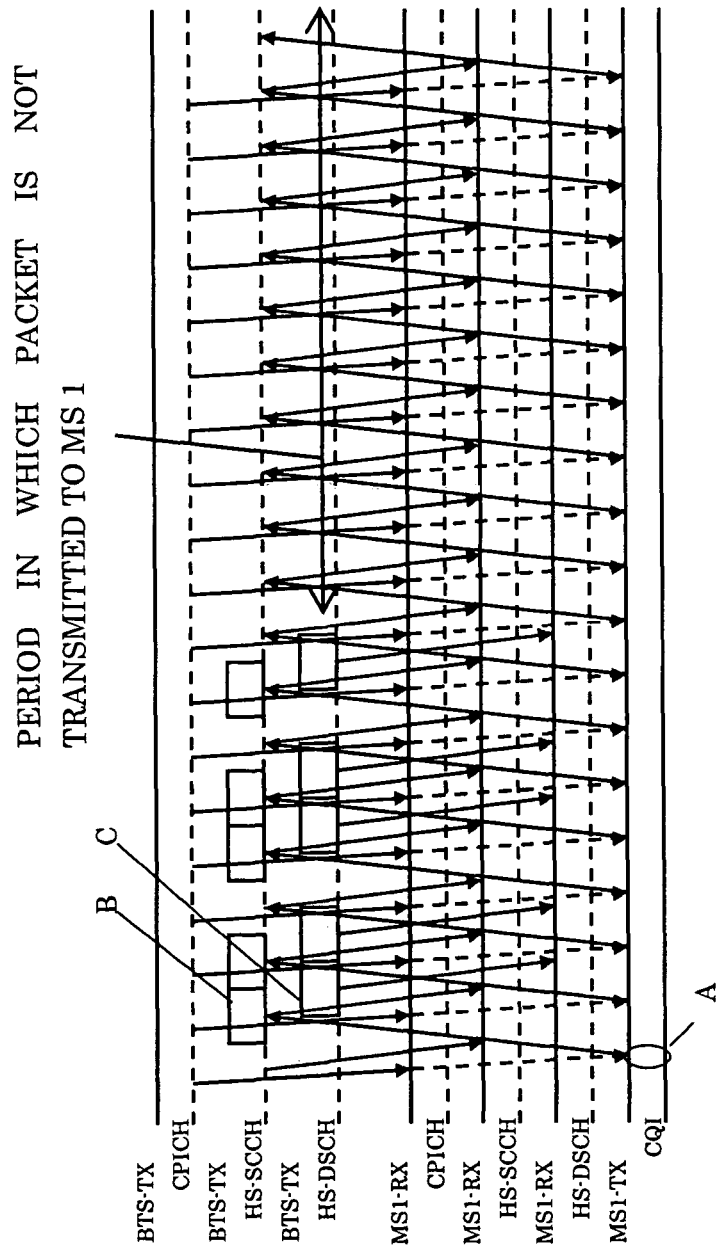
FIG. 2 shows the transmitting and receiving sequence in the HSDPA.
Figure 3:
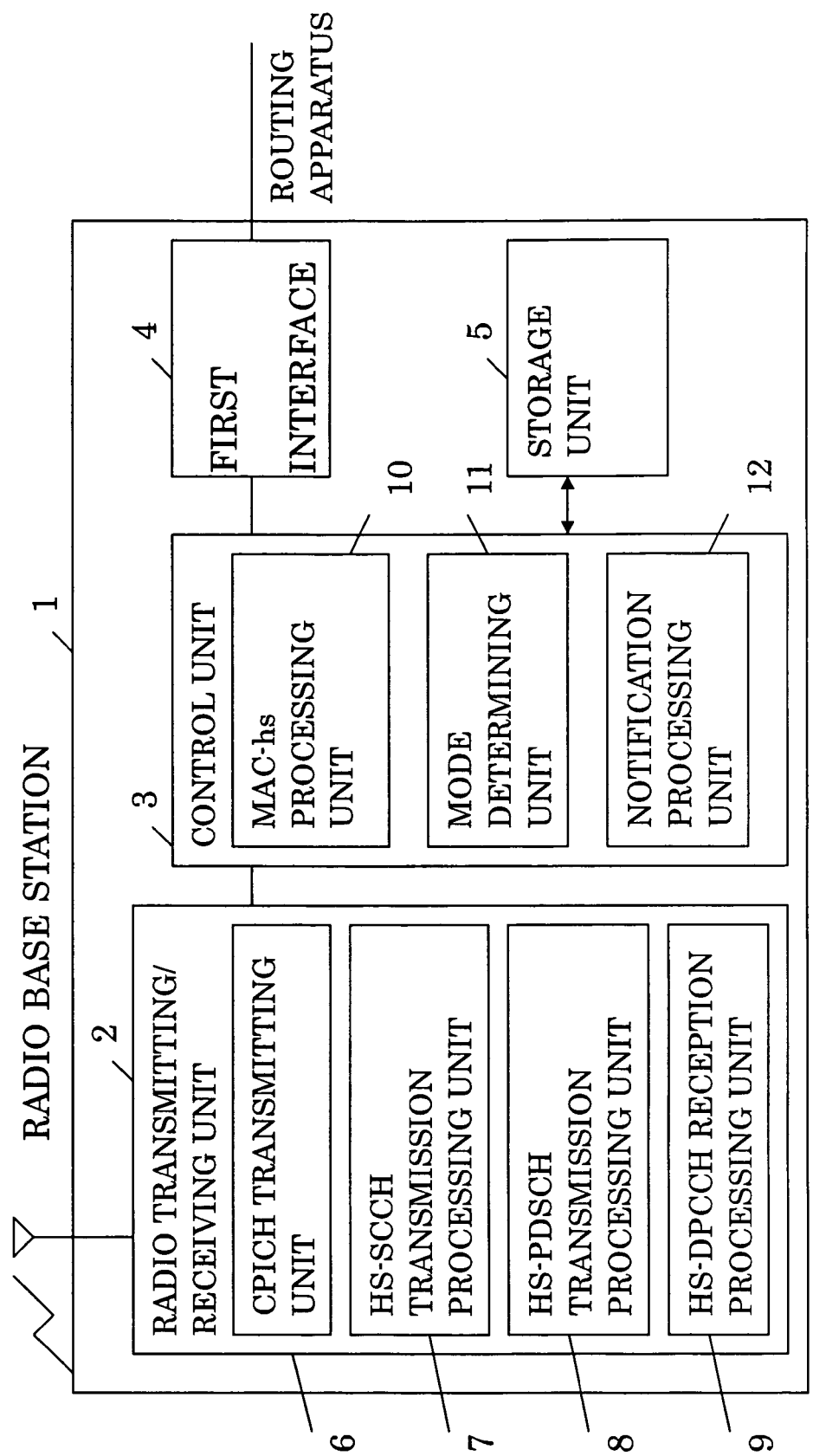
FIG. 3 shows a radio base station in the present invention.

FIG. 3 illustrates a structure of the radio base station corresponding to the HSDPA.

In this figure, the reference numeral 1 denotes a radio base station; 2, a radio transmitting/receiving unit for transmitting and receiving the radio signal to and from a mobile station; 3, a control unit for controlling respective units; 4, a first interface unit for interface with a routing apparatus (ATM exchange, router, base station control apparatus or the like); 5, a storage unit for storing data or the like transmitted via the shared channel to the mobile station.

The radio transmitting/receiving unit 2 is provided with the CPICH transmitting unit 6 as the transmitting unit of the CPICH for transmitting the data so that the mobile station is capable of measuring the quality of the downlink required for the adaptive modulation and coding.

Moreover, the radio transmitting/receiving unit 2 is provided with an HS-SCCH transmission processing unit 7 for transmitting the HS-SCCH in order to notify of transmission of the data via the shared channel HS-PDSCH.

As explained previously, the HS-SCCH is provided for use in notifying of the information required to receive the HS-PDSCH (modulation scheme, spreading code information or the like) to the mobile station, but the data can also be transmitted via the HS-PDSCH by eliminating the notification by the HS-SCCH.

In addition, the radio transmitting/receiving unit 2 is also provided with an HS-PDSCH transmission processing unit 8 for transmitting the HS-PDSCH (DSCH) which is the channel for accomplishing the high speed transmission of data, such as the packet data or the like, in order to adaptively control the transmission method in accordance with the CQI information.

Moreover, the radio transmitting/receiving unit 2 is also provided with an HS-DPCCH reception processing unit 9 for receiving the CQI information, ACK signal, and NACK signal transmitted from the mobile station.

Meanwhile, the control unit 3 is provided with a MAC-hs processing unit 10 for conducting the H-ARQ, a mode determining unit 11 for determining, for each mobile station, the mode on the basis of the transmitting data information, such as the amount of transmitting data, and a notification processing unit 12 for generating the signal (notifying signal) to notify of the result of the mode decision to the mobile station.

Next, the mobile station corresponding to the HSDPA will be explained with reference to FIG. 4.

Figure 4:
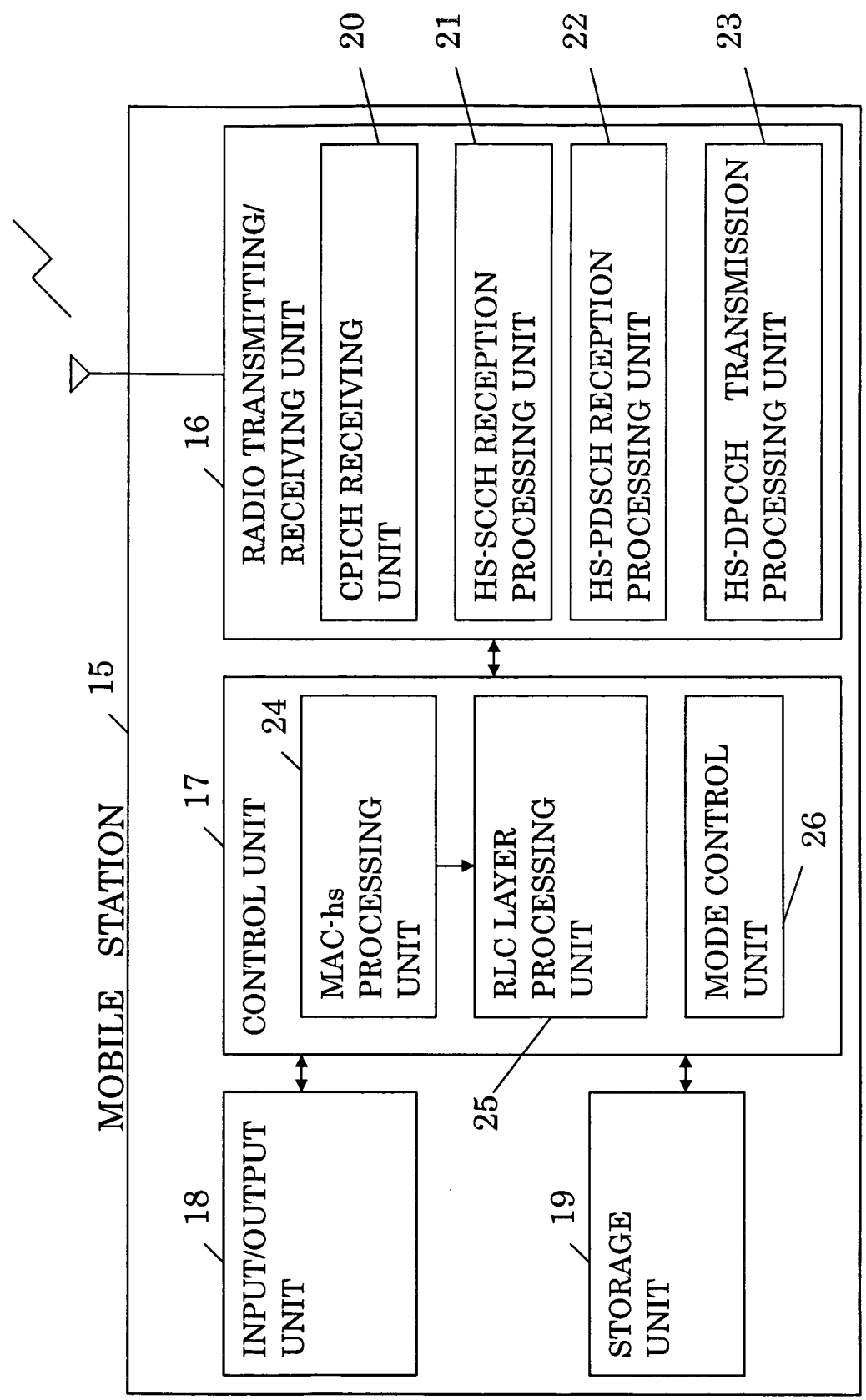
FIG. 4 shows a mobile station in the present invention.

In FIG. 4, the reference numeral 15 denotes a mobile station; 16, a radio transmitting/receiving unit for transmitting and receiving the radio signals to and from the radio base station; 17, a control unit for controlling respective units; 18, an input/output unit for inputting/outputting the information pieces such as voice, character and a variety of setting information pieces or the like; 19, a storage unit for storing the received data (data received via the HS-PDSCH) including a detected CRC error in order to realize the CQI table and H-ARQ indicating correspondence between the receiving quality of CPICH and the CQI information.

Moreover, the radio transmitting/receiving unit 16 includes a CPICH receiving unit 20, HS-SCCH reception processing unit 21, HS-PDSCH reception processing unit 22, and HS-PDSCH transmission processing unit 23, which are provided corresponding to each processing unit of the radio transmitting/receiving unit 2.

Meanwhile, the control unit 17 includes a MAC-hs processing unit 24 for controlling operation of the H-ARQ, an RLC layer processing unit 25 and a mode control unit 26 having the function for mode control explained later.

The structures of the radio base station and mobile station in relation to the embodiment of the present invention have been explained above.

Next, operations of these apparatuses will be explained with reference to FIG. 5.

As explained above, the control unit 17 of the mobile station 15 is provided with the mode control unit 26. When the mobile station 15 is set to the first mode, the HS-SCCH reception processing unit 21 and HS-DPCCH transmission processing unit 23 of the radio transmitting/receiving unit 16 operate like the first mode in FIG. 5.

Namely, in the first mode, the control unit 17 of the mobile station 17 receives the CPICH (pilot signal) at time A1 by controlling the CPICH receiving unit 20 to measure the reception quality of the CPICH obtained by the reception.

However, since reception of the CPICH is necessary for the demodulation process of the HS-SCCH and HS-DSCH, receiving operation is continued for the reception of the HS-SCCH and HS-PDSCH.

Figure 5:
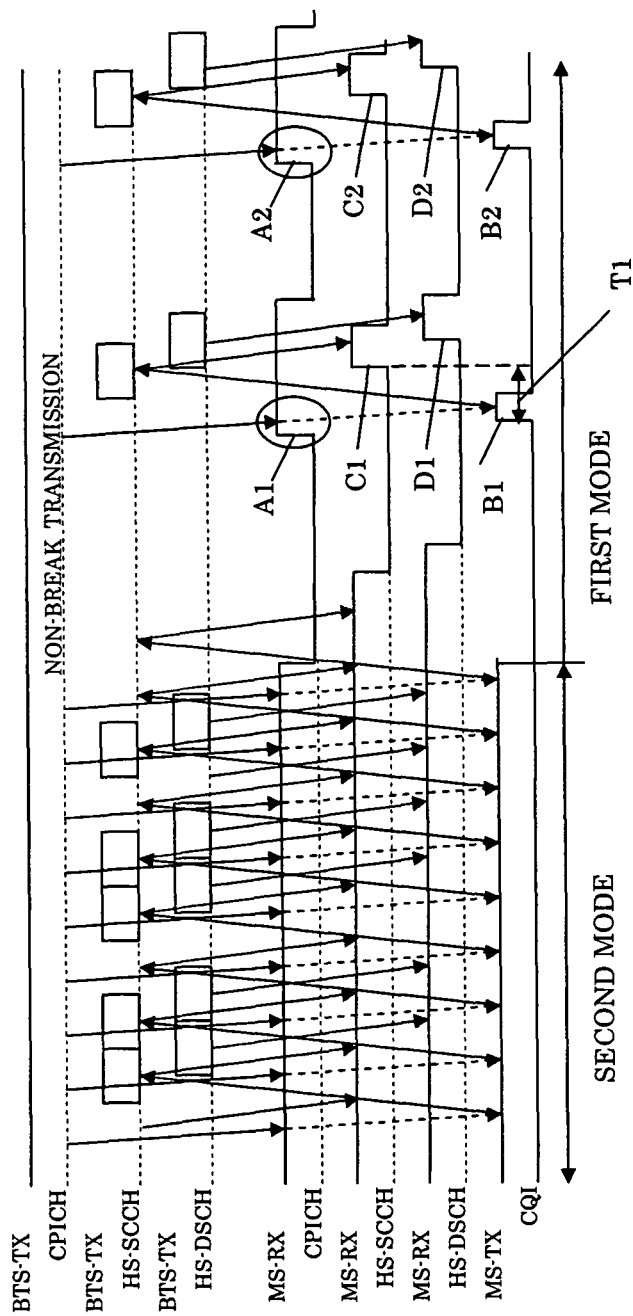
FIG. 5 shows the transmitting/receiving sequence (No. 1) in the present invention.

The control unit 17 acquires the result (for example, receiving SIR), reads the CQI information corresponding to the receiving SIR on the basis of the CQI table stored in the storage unit 19, and transmits this CQI information at time B1 of FIG. 5.

The mobile station 15 receives the HS-SCCH at time C1 in the figure within the predetermined time (T1) at time B1 and also receives at time D1 when transmission to its own station is forecast.

Thereafter, the control unit 17 controls, from the radio base station 1, not to receive transmission of the HS-SCCH and also controls the HS-SCCH reception processing unit 21 at time C2 to receive the HS-SCCH.

However, the control unit 17 also controls, before the predetermined time (T1) from the above control, the HS-DPCCH transmission processing unit 23 to transmit the CQI information.

Namely, the control unit 17 controls the CPICH receiving unit 20 to measure the reception quality of the CPICH at time A2 and to read the CQI information using the CQI table and also controls the HS-DPCCH transmission processing unit 23 to transmit the CQI information.

Reception of the HS-SCCH is accomplished intermittently (the radio base station 15 transmits the HS-SCCH but does not receive the same during the period from C1 to C2). However, since the CQI information which influences the transmission method is transmitted intermittently (transmitted at times B1, B2) via the HS-DPCCH the predetermined time (T1) before the intermittent reception, the latest CQI information (radio environment information) can be reflected on the HS-SCCH (HS-PDSCH) transmitted at the C1 (D1), C2 (D2).

However, it is desirable to set time T1 within the time at which the CQI information transmitted from the mobile station 15 is received by radio base station 1 and the CQI information can be reflected on reception of the transmitting data of the HS-SCCH. The reason is that the control unit 3 of the radio base station 1 determines the transmission method of the data transmitted via the HS-PDSCH on the basis of the received CQI information and the information of such transmission format is transmitted via the HS-SCCH. When the HS-SCCH is omitted, the T1 should be set to transmit enough CQI information to decide the transmission method of the HS-PDSCH.

When the mobile station 15 is in the first mode, it is desirable for the control unit 3 of the radio base station 1 to control the HS-SCCH transmission processing unit 7 not to transmit the HS-SCCH to the mobile station 15 within the period that is shorter than the transmission period of the HS-SCCH transmitted at the C1 and C2. The reason is that the HS-SCCH is never transmitted in the timing that the mobile station 15 does not receive the signal.

However, in the period from C2 to C2, the HS-SCCH may be transmitted within a short period to the other mobile stations.

Moreover, in this example, the mobile station 15 assumes, in the first mode, that the receiving period (first period) of the HS-SCCH is identical to the transmitting period (second period) of the CQI information transmitted via the HS-DPCCH.

Figure 6:
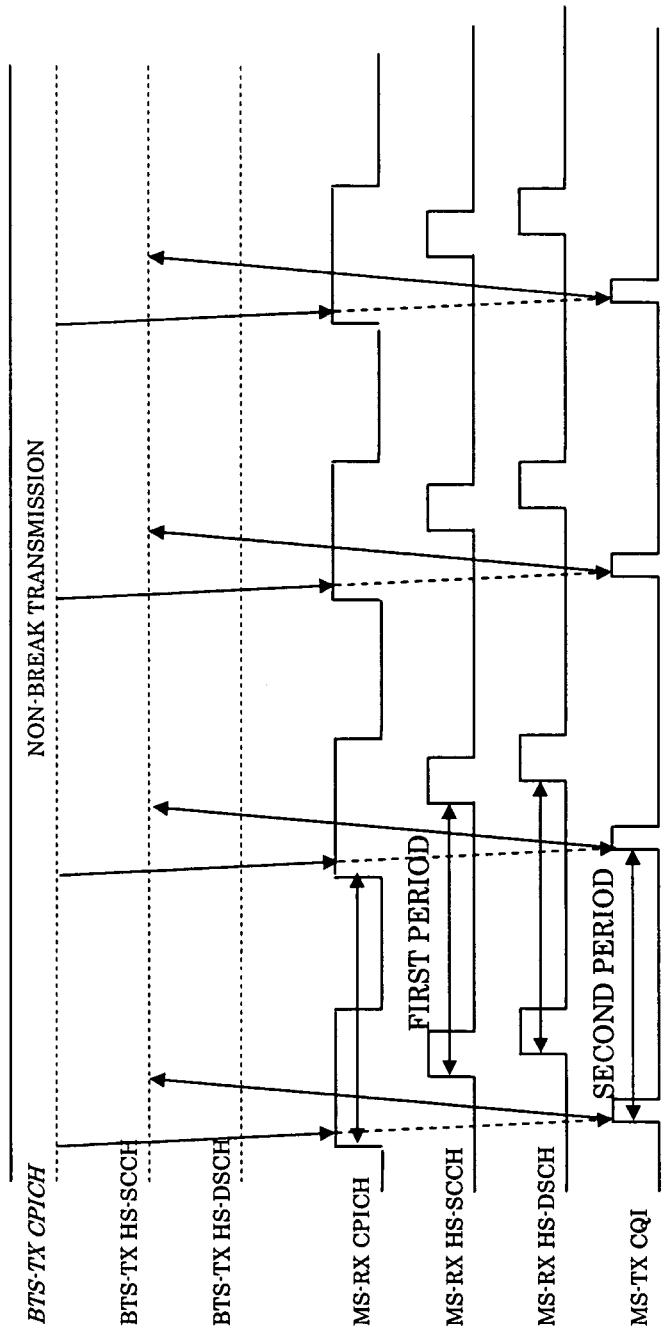
FIG. 6 shows the transmitting/receiving period (No. 1) in the present invention.

FIG. 6 is a diagram for explaining in detail the transmitting and receiving periods.

As illustrated in FIG. 6, the first period as the receiving period of the HS-SCCH is set identically to the second period as the transmitting period of the HS-DPCCH (CQI information).

The latest CQI information can be used every time for transmission of the HS-SCCH while the frequency of transmission of the CQI information is controlled as much as possible by setting the relationship of the periods explained above.

Of course, as illustrated in the figure, the receiving period of the CPICH (the third receiving period) for generation of the CQI information can be set identically to the first and second periods. Accordingly, useless measurement when the CQI information is not transmitted can be eliminated.

It is also possible that the second period is set longer than the first period.

Figure 7:
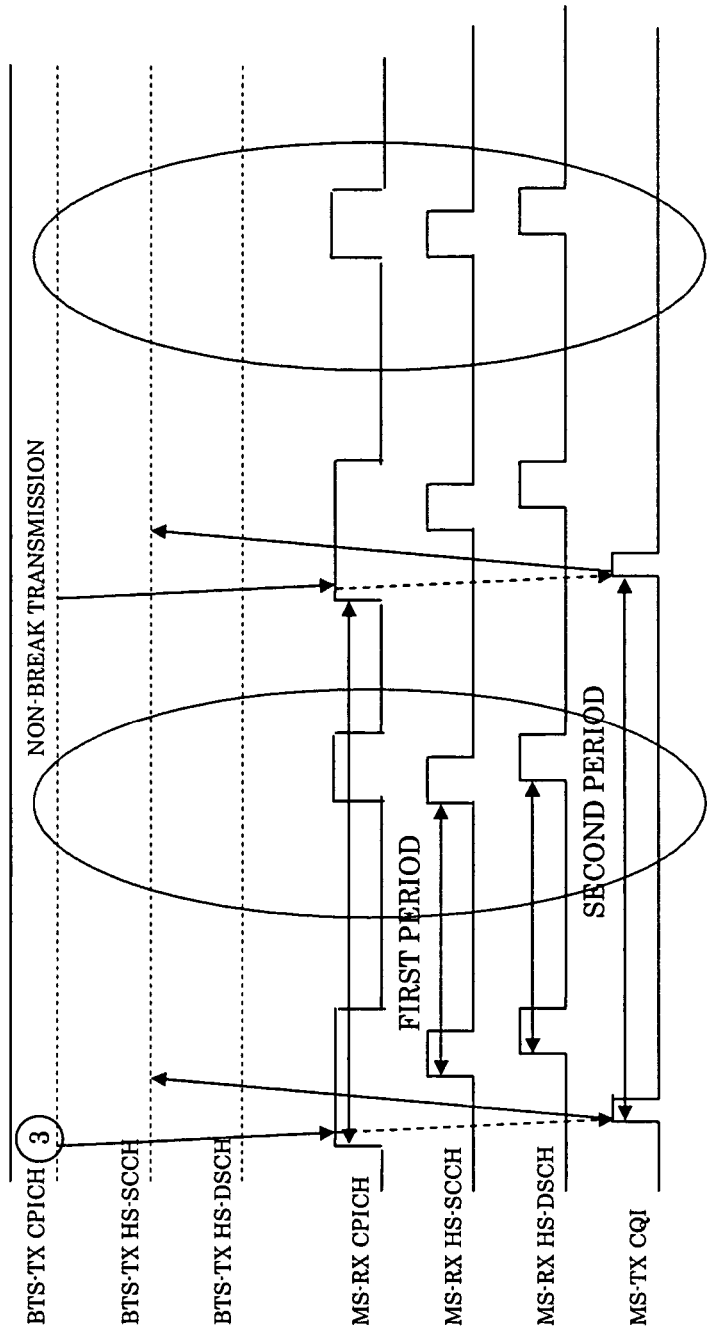
FIG. 7 shows the transmitting/receiving period (No. 2) in the present invention.

FIG. 7 is a diagram for explaining in detail the transmitting and receiving periods in such a case.

In this example, the mobile station 15 sets the transmitting period of the CQI information (second period) via the HS-DPCCH longer than the receiving period of the HS-SCCH (first period).

In general, the power required for transmission is higher than that required for reception and a change in the radio environment is sometimes not so large. Therefore, it is desirable to set the second period to a relatively longer period in order to reduce power consumption.

Moreover, it is also possible that the third period is set shorter than the second period, although the receiving period of the CPICH (the third receiving period) for generation of the CQI information is set identically to the transmitting period of the CQI information (second period) in FIGS. 5, 6 and 7.

Figure 8:
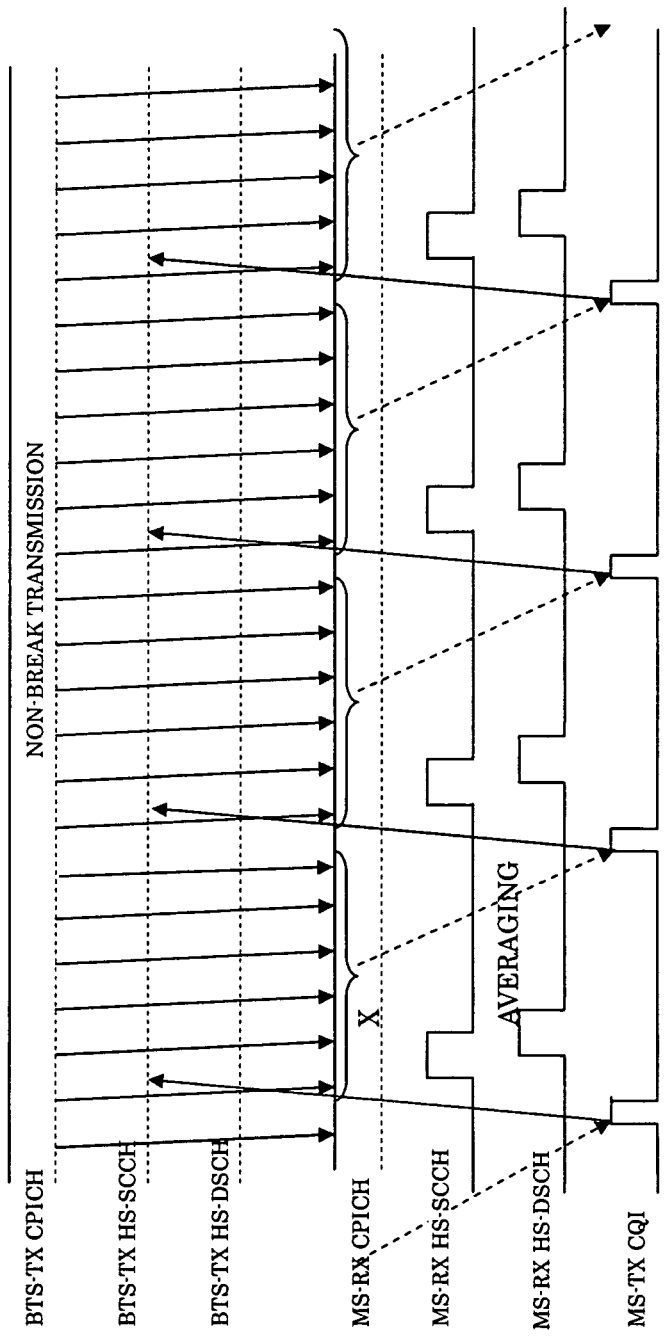
FIG. 8 shows the transmitting/receiving period (No. 3) in the present invention.

FIG. 8 is a diagram for explaining in detail the transmitting and receiving periods in the above case.

In this example, the control unit 17 of the mobile station 15 controls the radio transmitting/receiving unit 16 to intermittently receive the HS-SCCH in the first period and intermittently transmit the CQI information in the second period, which is identical to the first period. However, the control unit 17 controls, in this case, so that the receiving period of the CPICH (third period) becomes shorter than the second period.

Namely, the CQI information is transmitted in the second period before the predetermined time (T1) from reception of the HS-SCCH and the CPICH is received for several times during such period.

More preferably, the control unit 17 controls the HS-DPCCH transmission processing unit 23 to transmit CQI information data via the HS-DPCCH by averaging the results of measurements (receiving SIR or the like) of the CPICH received several times (refer to X in FIG. 8) and then by identifying the CQI information by referring to the CQI table of the storage unit 19 on the basis of the averaged result.

Accordingly, observation accuracy of the receiving environment in the mobile station 15 can be raised and the adaptive modulation and coding may be determined more accurately in accordance with the actual radio environment.

Returning to FIG. 5, the second mode will be explained.

As explained previously, the CPICH and HS-SCCH or the like are intermittently received in the first mode, but the CPICH, HS-SCCH or the like are received more frequently than the first mode (in the shorter period). For example, every sub-frame of the HS-SCCH is received (non-intermittently).

When there is much data to be transmitted to the mobile station 15, the HS-PDSCH is assigned more frequently to the mobile station 15. Therefore, the mobile station 15 is not so much required to reduce the number of times of reception with the intermittent reception. Accordingly, in this case, the HS-SCCH is received every time (in every sub-frame) at each transmission timing of the HS-SCCH and the CQI information is also transmitted frequently in the same timing as reception. Here, the CQI information may be transmitted intermittently but it should be transmitted more frequently than that in the first mode.

Settings can be changed between the first mode and the second mode with the mode control function unit 26 of the mobile station 15.

With the switching function between the first and second modes, the operational mode can be selected adequately in accordance with the conditions of the mobile station 15 and the processing load may also be set in accordance with the data receiving condition.

For example, when the period in which the data is not transmitted to its own station via the HS-PDSCH has exceeded the predetermined period, the control unit detects such a period and switches the mode to the first mode from the second mode, considering that higher efficiency can be attained by switching the operation mode to the first mode. At the beginning of the condition that the HSDPA service starts, since the data receiving condition is unclear, the operation mode is desirably switched to the second mode.

Here, the first mode is characterized in the point that it is longer than the second mode in the receiving period of the HS-SCCH and the transmitting period of the CQI information and moreover it is also possible that the first mode is characterized in the receiving period of the CPICH.

Such a characteristic of the first mode will be explained with reference to FIG. 9.

Figure 9:
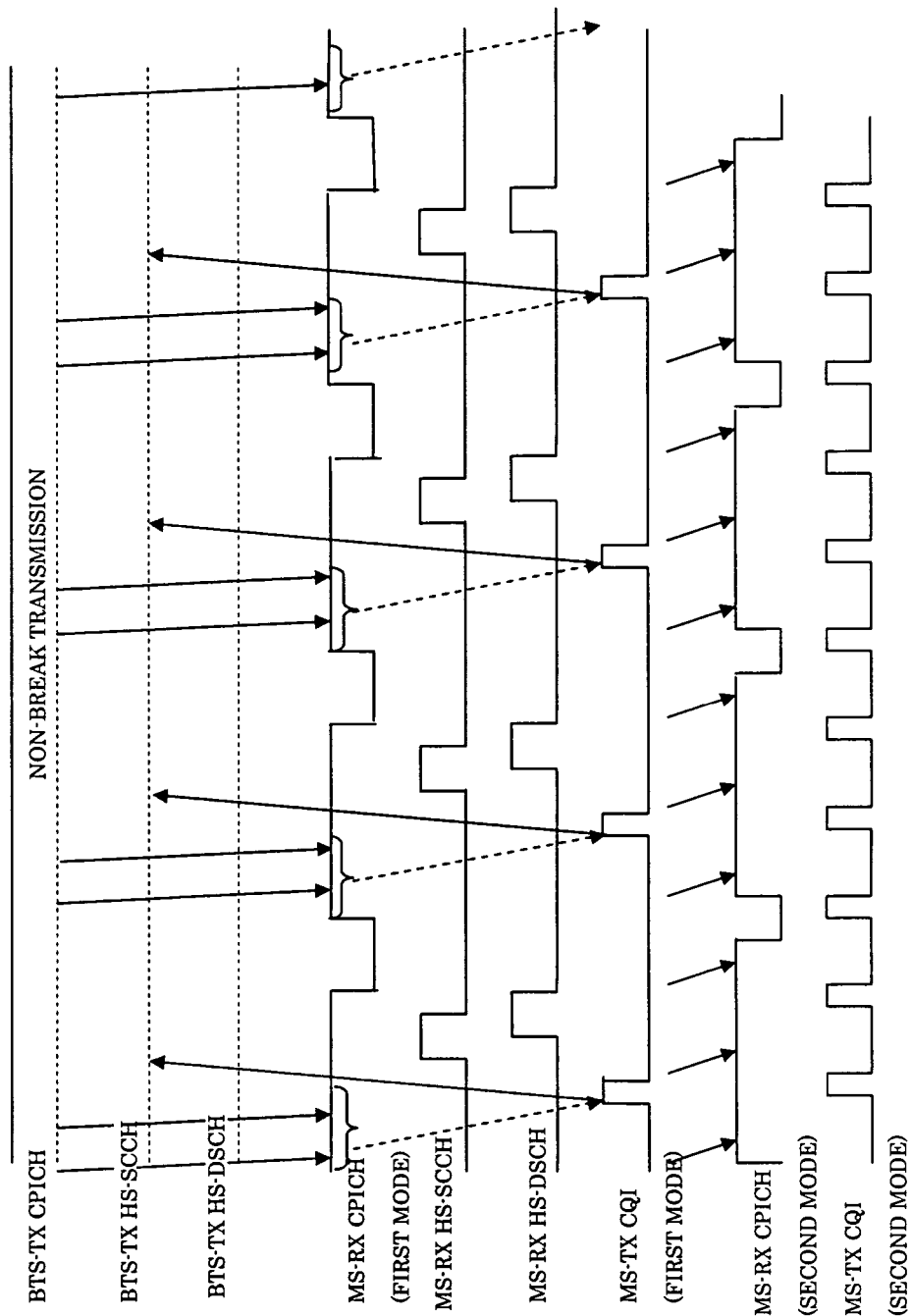
FIG. 9 shows the transmitting/receiving period (No. 4) in the present invention.

FIG. 9 is a diagram for explaining in detail the transmitting and receiving periods.

As illustrated in FIG. 9, the receiving period of CPICH is longer, in the first mode, than the second mode, but the time duration for reception is set longer.

In this case, it is desirable that the total receiving time of the CPICH is set longer, in such time duration, within the range to become shorter than the second mode.

Accordingly, the mobile station 15 is capable of generating the CQI information and transmitting this information to the radio base station 1 using the reception quality of the CPICH which has been measured for comparatively longer time while lowering the receiving load at the time of transmitting the CQI information.

Next, the third operation mode will be explained with reference to FIG. 10.

Figure 10:
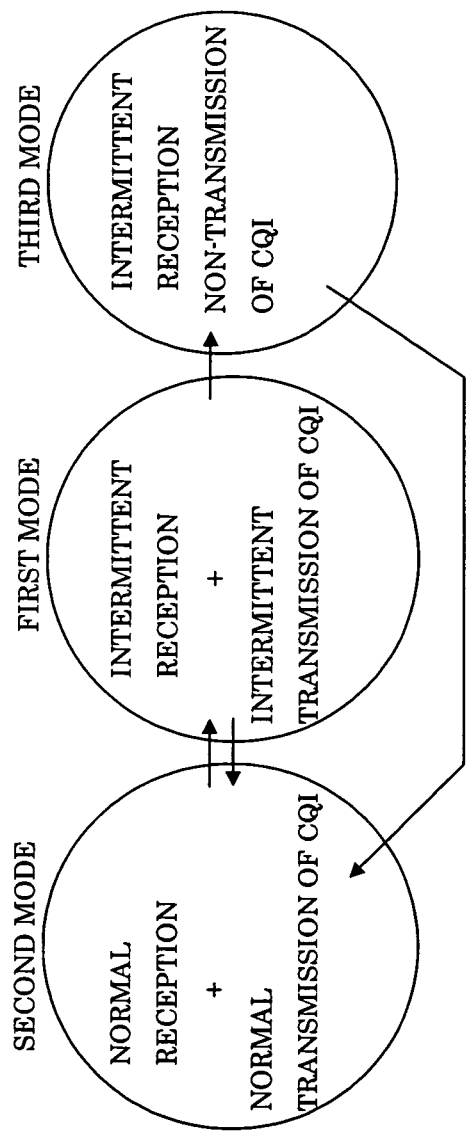
FIG. 10 shows operation modes in the present invention.

FIG. 10 is a diagram for explaining the operation mode in relation to the preferred embodiment of the present invention.

As explained previously, the mode control unit 26 is capable of switching the first mode and second mode, and moreover, this unit is also given the function to switch the operation mode to the third mode.

The third mode corresponds to the mode in which the transmission of the CQI information is stopped (it is also possible that the reception of CPICH is selectively stopped for generation of the CQI information).

Namely, the mode control unit 26 sets first the mode to the second mode and then sets the second mode to the first mode when the time in which the data is not transmitted to its own station via the HS-PDSCH from the radio transmitting/receiving unit 16 has passed the predetermined period (T2). Moreover, the mode control unit 26 changes the setting to the third mode when the time in which the data is not transmitted to its own station via the HS-PDSCH has passed the predetermined time (T2) from change of the setting. However, when the data is transmitted to its own station via the HS-PDSCH before the period T2 has passed after the change of setting to the first mode, the setting should desirably be returned to the second mode.

When the data is transmitted to its own station via the HS-PDSCH in the third mode, the setting may be reset to the first mode or to the second mode.

Accordingly, the processing load may be eased step by step in accordance with the data receiving condition via the shared channels.

In this example, the mobile station 15 switches the operational modes on the basis of self-determination. However, it is desirable for the radio base station 1 to be able to detect changes in the operational mode. Therefore, it is preferable that the control unit 17 of the mobile station 15 transmits the signal to notify of its own operation mode (notifying of a change in the mode) by controlling the radio transmitting/receiving unit 16 and the mode determining unit 11 of the radio base station 1 determines the mode of the mobile station 15 from such signal and transmits the HS-SCCH and HS-PDSCH to the mobile station 1 within the range of the receiving period (N times the receiving period (N is a natural number)) of the HS-SCCH corresponding to such mode. The control unit 3 controls, of course, the HS-DPCCH reception processing unit to also obtain the CQI information in the period corresponding to the mode.

On the contrary, the operation mode of the mobile station 15 can also be switched in accordance with the conditions of the radio base station 1. Since the radio base station 1 is capable of requesting the amount of data transmitted to the mobile station 15 via the HS-PDSCH on the basis of the information stored in the storage unit 5 and supervising the reception amount of data transmitted to the mobile station 15 with a first interface unit 4, the mode determining unit 11 determines the mode of the mobile station in accordance with the result of supervising operation and notifies the determined mode to the mobile station 15 from the notification processing unit 12 (for example, the notifying signal is transmitted from the radio transmitting/receiving unit 2 via the HS-SCCH).

The mode switching conditions may be considered as follows. When there is no data to be transmitted to the mobile station 15, the operation mode is determined as the third mode. When there is such data, but the amount of data is within the predetermined range or the priority of transmission of the mobile station 15 is lower than the predetermined priority, the mode is determined as the first mode. Other situations are determined as the second mode.

The mobile station 15 applies the mode notified from the notification processing unit 12 to the mode control function unit 26, while the mode control unit 26 sets the notified mode to the mobile station 15.

Figure 11:
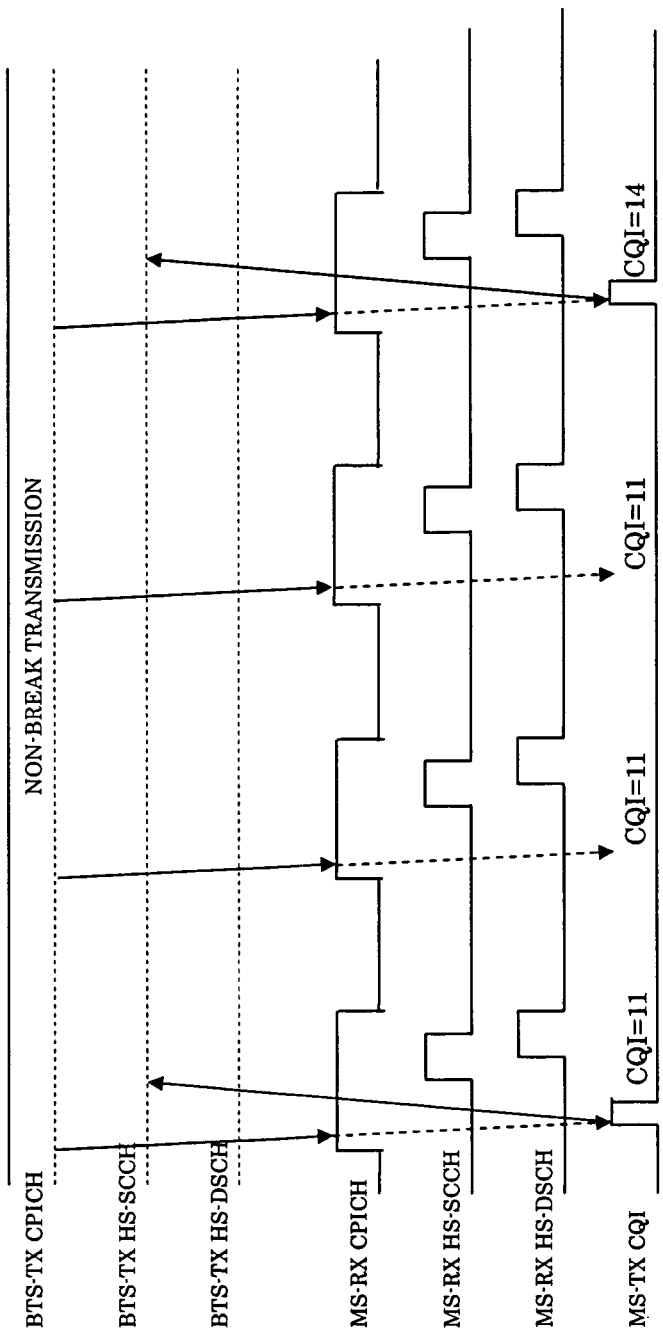
FIG. 11 shows the transmitting/receiving period (No. 5) in the present invention.

Finally, a method for reducing transmission of the CQI information will be explained with reference to FIG. 11.

This method may be introduced to further reduce the transmission of the CQI information even in either of the first and second modes.

Namely, in this method, the control unit 17 controls the transmission to not be executed even in the transmitting period, if the receiving SIR does not change so much and the CQI information is thereby not changed so much.

For example, the control unit 17 controls the transmission to not be performed when the CQI information is same as that in the preceding transmission or also controls the transmission to not be conducted considering that the CQI information is the same when the change of the CQI information is within the predetermined range (for example, when the CQI information changes a little in the range 1 or 2).

The range in which the CQI information is considered as almost the same is desirably set to the range in which the modulation schemes of QPSK and 16QAM or the like are not changed, because amount of data to be transmitted changes to a large extent, resulting in a large influence on the data transmission efficiency, if the amount of data is considered as identical.

According to the present invention, the processing load of a communication apparatus (mobile station) may be eased during data transmission using the shared channels.

Moreover, the adaptive modulation and coding may be accomplished effectively while the processing load is alleviated.

What is claimed is:

1. A radio communication method comprising:
    receiving intermittently, at a mobile station, information indicating a transmission format used for a shared channel via which data is received;
    transmitting intermittently, from the mobile station, Channel Quality Indicator (CQI) information relating to the transmission format used for the shared channel in a first mode;
    setting the timing of the intermittent transmission of the CQI information a given time before the reception of the information indicating a transmission format used for the shared channel, the CQI information being transmitted periodically; and
    switching from the first mode to a second mode in which the CQI information is transmitted more frequently than in the first mode.

2. The radio communication method according to claim 1, further comprising:
    setting a period of the intermittent transmission in the first mode identically to or longer than a period for the reception of the information indicating a transmission format used for the shared channel.

3. The radio communication method according to claim 1, further comprising:
    setting a period of the intermittent transmission in the first mode identically to or longer than a reception period of a periodic signal used for the CQI information.

4. The radio communication method according to claim 1, further comprising:
    setting, for the second mode, a longer time duration of reception for generating the CQI information than a time duration in the first mode.

5. The radio communication method according to claim 1, wherein
    the switching includes accomplishing a switching operation in accordance with a period in which the data is not transmitted to the radio communication apparatus via the shared channel.

6. The radio communication method according to claim 1, wherein
    the switching includes switching the second mode to the first mode when a period in which data is not transmitted to the mobile station via the shared channel has passed a given period.

7. The radio communication method according to claim 1, wherein
    the switching includes switching the first mode to the second mode when data is transmitted to the mobile station via the shared channel after switching to the first mode.

8. The radio communication method according to claim 1, wherein
    the switching includes switching the first mode to the second mode when data is transmitted to the mobile station via the shared channel after the switching to the first mode.

9. The radio communication method according to claim 1, wherein
    the switching includes switching the first mode to the second mode when data is transmitted to the mobile station via the shared channel before a given period has passed after switching to the first mode.

10. The radio communication method according to claim 9, wherein a third mode is set to allow the intermittent reception but does not allow the intermittent transmission is accomplished.

11. A radio communication method comprising:
  transmitting, from a radio communication apparatus to a mobile station, information indicating a transmission format used for a shared channel via which data is transmitted, the mobile station intermittently receiving the information indicating a transmission format in a first mode, the mobile station intermittently transmitting Channel Quality Indicator (CQI) information at a timing in the first mode, the CQI information relating to the transmission format, and the mobile terminal transmitting the CQI information at a given time before the reception of the information indicating a transmission format, and the CQI information is transmitted periodically;
  control switching from the first mode to a second mode in which the CQI information is transmitted more frequently than in the first mode; and
  receive, at the radio communication apparatus, the CQI information from the mobile station.

12. The radio communication method according to claim 11, wherein a period of the intermittent transmission in the first mode for the CQI information is set identically to or longer than a period for the reception of the information indicating a transmission format used for the shared channel.

13. The radio communication method according to claim 11, wherein a period of the intermittent transmission in the first mode for the CQI information is set identically to or longer than a reception period of a periodic signal used for generating the CQI information.

14. The radio communication method according to claim 11, wherein, for the second mode, a longer time duration of a reception period of a periodic signal used for the CQI information than a time duration in the first mode is set.

15. The radio communication method according to claim 14, wherein the third mode is set in accordance with a period in which the data is not transmitted to the mobile station via the shared channel.

16. A radio communication method comprising:
  performing limitation of a period allowing transmission of data to non-continuous periods, the data being transmitting via a shared channel from a radio communication apparatus to a particular communication apparatus, and
  transmitting the data from the radio communication apparatus to the particular communication apparatus within a range of the limited period based on Channel Quality Indicator (CQI) information relating to a transmission format of the data, the CQI information being intermittently transmitted in a first mode from the particular communication apparatus at a timing a certain time before a start of the non-continuous periods; and
  controlling switching from the first mode to a second mode in which the CQI information is transmitted more frequently than in the first mode.

17. The radio communication method according to claim 16, further comprising:
  controlling notification of the limitation of the period to the particular communication apparatus.

18. The radio communication method according to claim 16, wherein
  the performing limitation includes setting the period in accordance with data to be transmitted to the particular communication apparatus via the shared channel.

* * * * *